3,230,150
METAL-CLAD FUEL ELEMENT WITH COPPER FOIL INTERLAYER

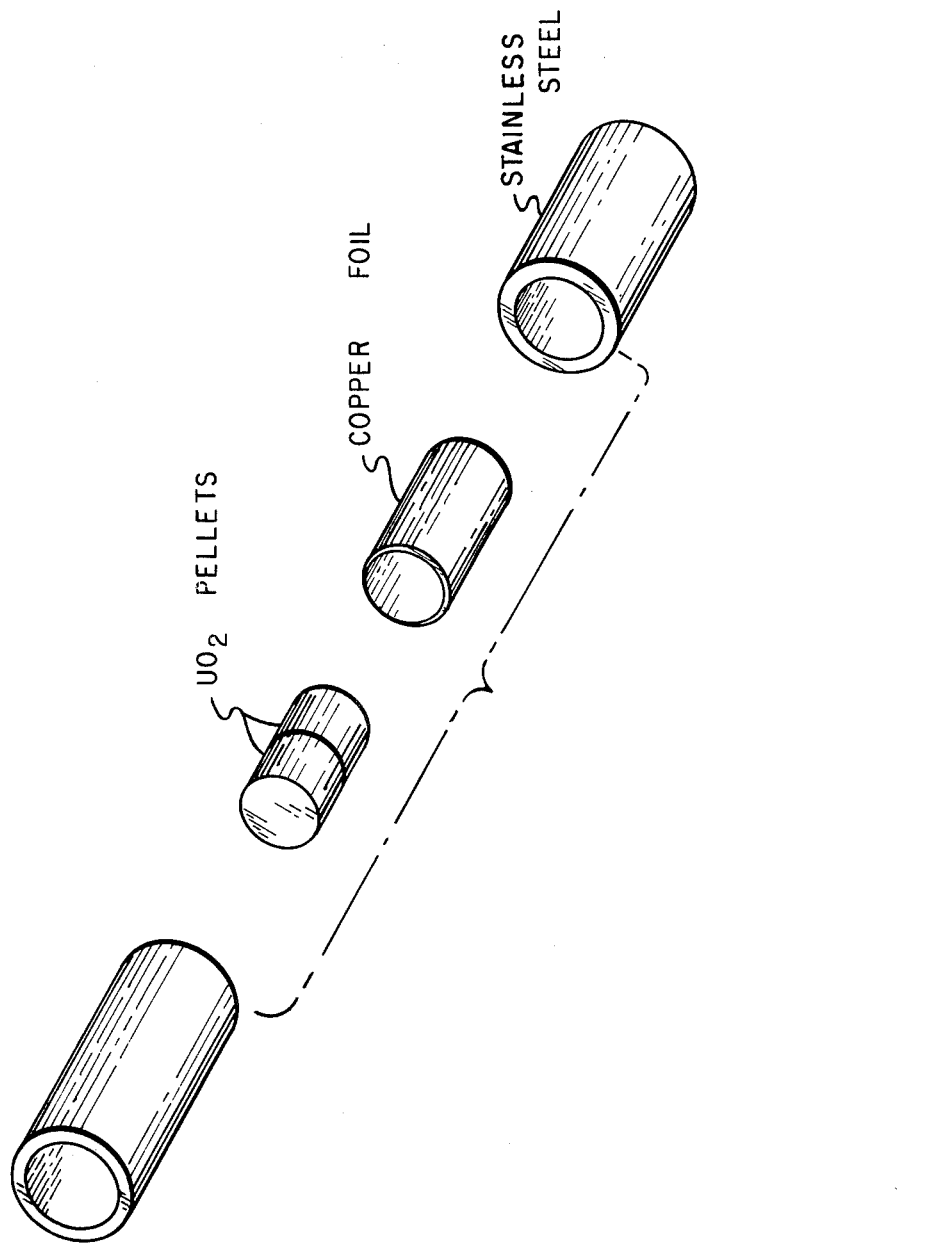

William R. Martin and James R. Weir, Oak Ridge, Tenn., assignors to the United States of America as represented by the United States Atomic Energy Commission
Filed Nov. 18, 1963, Ser. No. 324,592
3 Claims. (Cl. 176—68)

This invention relates, generally, to ceramic nuclear reactor fuels and more particularly to a method for preventing permanent, axial elongation in metal-clad ceramic fuel elements.

It has been found that metal-clad ceramic tubular-type fuel elements, such as used in the Experimental Gas Cooled Reactor (EGCR), at Oak Ridge, Tennessee, tend to progressively elongate axially during thermal cycling. This axial elongation results from the combined effects of contact between the cladding and fuel and the differential rates of thermal expansion of the fuel and the cladding. Under certain reactor operating conditions, the cladding tends to deform plastically and grip the fuel.

Upon heat-up, the fuel tends to expand both radially and axially at a rate greater than does the cladding, with the result that the cladding becomes strained beyond its elastic limit. As the fuel element again cools, the cladding does not return to its original length, and upon repeated thermal cycling, the expansion and contraction of the fuel material causes a ratcheting effect which seriously affects the metallurgical life of the cladding. The result of the ratcheting is that strains are introduced in the cladding that could lead to fracture of the cladding and the release of fission products into the coolant gas stream, thereby imposing serious radiation hazards by the contamination of the coolant stream.

Heretofore, various methods have been devised to try to reduce or eliminate such stresses induced in the fuel cladding material by thermal cycling. The problem of radial expansion can somewhat be alleviated by providing a small space between the fuel and the cladding material into which the fuel may expand without this ratcheting effect occurring.

With respect to the problem of axial elongation, various fuel configurations have been designed, such as pellets having tapered ends, to try to compensate for the axial elongation of the pellets but without complete success. The inventors herein have attempted solution of the problem by placing various powders, such as graphite and $CaF_2$, in the radial gap between the fuel and the cladding. However, the carburizing effect of the graphite made it unsuitable for use with stainless steel and powders, in general, have been unsuitable due to the difficulty of achieving a uniform distribution between the fuel and the cladding.

It is, therefore, a general object of this invention to provide a method for constructing a fuel element for a nuclear reactor which prevents permanent, axial elongation of the ceramic fuel pellets in the element during reactor thermal cycling.

Another object is to reduce the strains induced in fuel cladding due to reactor thermal cycling by providing a fuel element wherein both fuel and cladding are permitted to move relative to each other during reactor thermal cycling.

In accordance with the present invention a method of preventing permanent, axial elongation or ratcheting in metal-clad ceramic fuel elements is effected by placing a layer of metal between the ceramic fuel and the external cladding. It has been found that by placing a copper foil of about 0.001 inch thick between the ceramic fuel and the cladding, the permanent axial deformation, or axial elongation, was reduced by as much as 80% as experienced without the copper foil.

Referring to the largely self-explanatory single drawing, a stainless steel clad ceramic tubular element is shown in an exploded view. The ceramic fuel element consists of a multiplicity of stacked $UO_2$ pellets which are wrapped in a thin copper foil and inserted into a stainless steel tubular sheath.

The inventors have found that the material must have low shear strength over the range of expected operating temperatures of the reactor and must be compatible with both the fuel and the cladding as well as having good nuclear properties. Copper was found to have a low shear strength between about 1300° F. and its melting temperature 1981° F. which covers the range of expected operating temperatures of the Experimental Gas Cooled Reactor.

At temperatures below 1000° F. the copper was not as effective in reducing the stresses induced in the cladding. However, the axial elongation at such lower temperatures was not as severe as those encountered with higher temperatures.

It will, of course, be appreciated that the copper has an upper temperature limit, i.e., its melting temperature, that should not be exceeded to insure optimum results. Thus, it is seen that in reactor systems incoporating metal-clad ceramic fuel elements wherein the temperature range to which the fuel element cladding is subjected is between 1300° F. and 1980° F. copper is quite efficacious in retarding permanent axial elongation of the fuel elements, thereby greatly minimizing the probability of cladding failure due to induced stresses within the cladding.

While there is some indication that the copper will diffuse into the cladding material, it did not appear to adversely affect the efficiency of the copper in reducing the axial elongation by causing embrittlement of the cladding for the temperatures up to 1500° F.

With its good mechanical properties, copper afforded easy fabrication of the foils into the fuel assemblies. The copper foil may be placed in the cladding material and then the fuel pellets inserted into the cladding or the foil may be wrapped tightly around the fuel pellets and then the wrapped pellets inserted into the cladding. Inasmuch as the diametral clearance in these type fuel elements were on the order of about 0.004 inch, copper foils of about 0.001 inch were easily accommodated within the space and as such were greatly preferred.

Further illustration of the quantative aspects and procedures of the present invention is provided in the following example.

Example

An assembly of 14 production-type, hollow, cylindrical $UO_2$ fuel pellets (0.707" O.D. by 0.323" I.D. by 0.750" long) were wrapped in a single layer of 0.001" copper foil and inserted into a type 304 stainless steel tube (the same as used for cladding the fuel for the EGCR) having a diametral clearance of 0.004" between the fuel and the cladding. The fuel assembly was placed in an apparatus designed to simulate the thermal cycling encountered under reactor operation conditions. The fuel assembly was rapidly heated to a temperature of 1475° F. and quickly cooled to a temperature of 425° F. at various pressures. Instrumentation was provided for measuring the temperatures at various locations as well as measuring the axial dimensional changes due to thermal expansion of the simulated fuel element.

After 100 thermal cycles at 100 p.s.i. it was repeated for pressures of 200 and 300 respectively.

The results are shown in Table I.

TABLE I.—COMPARISON OF THERMAL CYCLING STRAIN AND AXIAL EXTENSION

| Coolant Pressure, p.s.i. | Plastic Strain/cycle— | | Total Axial Extension [1]— | |
|---|---|---|---|---|
| | without Copper | with Copper | without Copper | with Copper |
| 300 | $4 \times 10^{-4}$ | $5.8 \times 10^{-5}$ | 0.400 | 0.058 |
| 200 | $2.5 \times 10^{-4}$ | [2] $<5 \times 10^{-6}$ | <0.250 | 0.005 |
| 100 | [2] $<1 \times 10^{-5}$ | | | |

[1] Total permanent elongation of a 10 inch element after 100 thermal cycles.
[2] None observed.

The results of Table I demonstrates the efficiency of the copper foil in retarding permanent axial elongation as well as reducing the strain induced in the cladding. After 100 thermal cycles from a low temperature of 425° F. to a high temperature of 1475° F. at 300 p.s.i. pressure differential the fuel assembly had experienced only 0.058 inch elongation or approximately 80% less than that normally experienced without the copper.

It is to be understood that the foregoing example is merely illustrative and is not intended to limit the scope of this invention, but the invention should be limited only by the scope of the appended claims.

What is claimed is:

1. A nuclear reactor fuel element comprising a ceramic fuel core, an external cladding, and a thin layer of copper disposed therebetween.

2. A nuclear reactor fuel element comprising a multiplicity of cylindrical $UO_2$ fuel pellets, an external stainless steel cladding, and a copper foil disposed therebetween.

3. The article of claim 2 wherein said layer of copper is substantially 0.001 inch copper foil.

References Cited by the Examiner

UNITED STATES PATENTS

| | | | |
|---|---|---|---|
| 2,854,737 | 10/1958 | Gray | 176—91 |
| 2,854,738 | 10/1958 | Gray | 176—91 |
| 3,085,059 | 4/1963 | Burnham | 176—82 |
| 3,098,024 | 7/1963 | Barney et al. | 176—82 |

LEON D. ROSDOL, *Primary Examiner.*

L. DEWAYNE RUTLEDGE, CARL D. QUARFORTH, *Examiners.*

J. V. MAY, M. J. SCOLNICK, *Assistant Examiners.*